(12) United States Patent  
Guillemaud

(10) Patent No.: US 6,296,387 B1
(45) Date of Patent: Oct. 2, 2001

(54) METHOD FOR CORRECTING IMAGE DEFECTS FROM A MATRIX-TYPE X OR γ-RAY DETECTOR

(75) Inventor: Régis Guillemaud, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/438,367

(22) Filed: Nov. 12, 1999

(30) Foreign Application Priority Data

Nov. 30, 1998 (FR) .................................................. 98 15044

(51) Int. Cl.$^7$ .............................. G01D 18/00; G06K 9/40
(52) U.S. Cl. ......................... 378/207; 378/98.8; 382/272; 382/275
(58) Field of Search .................................. 378/98.8, 207; 382/272, 275

(56) References Cited

U.S. PATENT DOCUMENTS

| 5,617,461 | * | 4/1997 | Schreiner | 378/98.5 |
| 5,832,055 | * | 11/1998 | Dewaele | 378/62 |
| 5,881,182 | * | 3/1999 | Fiete et al. | 382/275 |
| 5,886,353 | * | 3/1999 | Spivey et al. | 250/370.09 |

FOREIGN PATENT DOCUMENTS

| 0 775 414 | 5/1997 | (EP) . |
| WO 95/01045 | 1/1995 | (WO) . |

OTHER PUBLICATIONS

H. Knutsson, et al., IEEE Computer Society Conference on Computer Vision a Pattern Recognition, pp. 515–523, "Normalized and Differential Convolution. Methods for Interpolation and Filtering of Incomplete and Uncertain Data," Jun. 15–18, 1993.

F. Glasser, et al., SPIE, Medical Imaging, vol. 3032, pp. 513, "Recent Developments on a CdTe Based X–Ray Detector for Digital Radiography," Feb. 22/28, 1997.

* cited by examiner

Primary Examiner—Robert H. Kim
Assistant Examiner—Allen C Ho
(74) Attorney, Agent, or Firm—Oblon, Spivak, McClelland, Maier & Neustadt, P.C.

(57) ABSTRACT

The invention relates to a method for correcting image defects from a matrix-type X or γ-ray detector, consisting in producing a confidence map on the basis of continuous confidence ratings, between 0 and 1, and representing the level of confidence assigned to each detector pixel. It then consists in using this confidence map to correct the defects of the matrix detector.

5 Claims, 4 Drawing Sheets

METHOD FOR CORRECTING IMAGE DEFECTS FROM A MATRIX-TYPE X OR γ-RAY DETECTOR

FIELD OF THE INVENTION

This invention relates to a method for correcting image defects from a matrix-type X or γ-ray detector, and in particular, for correcting defective or missing pixels in this image, by assigning to each image pixel a confidence rating between 0 and 1.

The invention is implemented in all fields using digital images produced through X or γ-rays, and more particularly, in the medical field and the dental field, in X or γ-ray digital radiographic imaging.

STATE OF THE ART

In the field of X or γ-ray digital radiographic imaging, the system used is generally a standard image acquisition system. Such system can comprise an X or γ radiation source (e.g. a bidimensional X tube or X detector, for X-rays), that provides, at the output, an image representative of the amount of X or γ-photons transmitted through the radiographed object that is placed between the source and the detector. In some instances, the object itself is a source of γ-rays.

However, the images thus acquired may contain a number of defects, most of which are related to the detector. These defects come from one or more pixels, called defective pixels, which behave absurdly and consequently provide a value that is not related to the amount of X or γ-photons received in this region of the detector. Such defective pixels can also be due to a lack of measurement, i.e. that these defective pixels form an image area where the detector could not take a measurement.

For instance, the solid X-ray detector, described in "Recent developments on a CdTe based X-ray detector for digital radiography", F. GLASSER et al., SPIE conference on Medical Imaging, Feb. 22/28, 1997, and designed for digital dental radiography, is composed of a CdTe semiconductor with four CMOS circuits arranged in a 2×2 matrix. The connection between the semiconductor and the scanning circuits is performed by means of indium beads. Such detectors have two types of defects:

random defects related in particular to the semiconductor and the connections between the semiconductor and the scanning circuit; and cross-shaped missing lines and columns at the junction between the four scanning circuits.

The defects of this detector appear, in particular in FIGS. 3A and 3C, which show the image of a known object and the image of a tooth to be examined, respectively.

Obviously, these defective pixels are detrimental to the visual image quality and consequently to its usage. Therefore, such pixels must be detected and their values corrected.

When the defective pixels are isolated, correcting the image is simple; it is done by interpolation with regard to neighboring pixels of the defective pixel considered.

In other cases, these defective pixels can be grouped and form whole image areas, which may be rather big and of any shape. These areas can form, e.g. a line or a column, or else a set of lines or columns of defective pixels, or even a cluster of any shape.

There are already methods for correcting a set of defective pixels. Such methods generally use a conventional technique consisting in a binary determination of defective pixels based on thresholding a criterion. The choice of this criterion is difficult; indeed, if the threshold is chosen too low, defective pixels may not be detected; if it is too high, the areas of defective pixels will be determined as being larger than they really are, which makes a proper correction of the defective pixels more difficult.

The difficulty of choosing the criterion therefore implies a difficult implementation of the method. In addition, the results obtained with this method are not very reliable as they depend on the criterion chosen.

DESCRIPTION OF THE INVENTION

It is precisely the object of the invention to remedy the disadvantages of the method described before. For this purpose, it provides a method for correcting X or γ image defects, based on constructing a confidence map grouping the confidence ratings (being continuous, between 0 and 1) of all the detector pixels.

More precisely, the invention relates to a method for correcting the image defects (related to defective pixels or pixels not measured by the detector), from a matrix-type X or γ-ray detector, consisting in calibrating the detector, then correcting the defective pixels of the image to be corrected. The method is characterized in that the calibration step comprises the following operations:

a) acquiring a black image;
  b) acquiring at least one image of a known object;
  c) determining at least one offset and mean gain image;
  d) acquiring at least one image of the object to be measured with uniform attenuation when the detector is of the X-ray type and uniform emission when it is of the γ-ray type;
  e) determining a first average and a first standard deviation for the whole image of the object to be measured;
  f) producing a first confidence map depending on the gray levels of the image pixels as well as the standard deviation and the average determined at step e);

and in that the correction step consists in acquiring an image of the object to be measured and correcting the image of the object on the basis of the confidence map and the last object image acquired.

According to an alternative embodiment of the invention, the calibration step comprises, after the operation f) of producing a first confidence map, the following operations:

g) in the image of the known object, determining a gray level gradient (18);
  h) determining (19–22) a second average and a second standard deviation, then a second confidence map (C2); and
  i) determining (24) a third confidence map (C3) by multiplying, pixel-wise, the first and second confidence maps.

Advantageously, the first and second confidence maps are composed of the set of confidence ratings assigned to each image pixel, the confidence rating of each pixel being determined depending on the pixel's gray level, as well as the standard deviation and the average of the whole image of the object to be measured.

According to a preferred embodiment of the invention, step b) of acquiring the image of a known object is carried out with a uniform attenuation.

According to an alternative embodiment of the invention, where the image defect are the result of the lack of measurement in at least one image area, the calibration step, after operation f) or i) consists in:

magnifying (241) the image of the object to be measured;

adding (242), at the location of the image area not measured, pixels with zero confidence ratings; and determining (243) a fourth confidence map, on the basis of the first and third confidence maps, taking into account the zero confidence ratings;

and in that the correction step consists in performing another image acquisition of the object to be measured (244), applying the magnification to it and correcting the object image on the basis of the fourth confidence map and the last object image acquired.

DETAILED DESCRIPTION OF THE EMBODIMENTS OF THE INVENTION

It is an object of the inventive method to correct defective or missing image pixels from a matrix-type X or γ-ray detector made of pixels. More precisely, this method consists in constructing a confidence map on the basis of continuous confidence ratings, between 0 and 1, and representing the confidence level assigned to each detector pixel. It then consists in using this confidence map for correcting the defects of the matrix detector using filtering, like KNUTSSON filtering, to be described later, or partial differential equation (PDE) filtering.

According to the invention, the detection of defective pixels is not binary, but continuous, which allows for more precise processing at border areas of defective pixels.

The inventive method comprises two main steps, namely:
- a detector calibration step that consists in performing the acquisition of one or several images of a known reference object; then, on the basis of these images, detecting defective pixels, then determining the confidence map grouping the set of confidence ratings for all the image pixels;
- a correction step that consists in correcting, on the basis of the confidence map, the image of the object to be measured using filtering, such as the one proposed by KNUTSSON.

Generally speaking, the detection of defective pixels is performed through the acquisition of one or more images of a known reference object that preferably has uniform attenuation.

In case there is no defective pixel on the detector, the image obtained is uniform, except for the noise created by generating X or γ-photons, detecting and converting these X or γ-rays into numerical values.

In case there are defective pixels on the detector, the detection of such defective pixels is done on the basis of a statistical analysis of the calibration image obtained and the corresponding gradient image, because a defective pixel either has an absurd value or a steep gradient. When the defective pixels are detected, each of these pixels is assigned a confidence rating varying continuously from 0 to 1.

Defined defect detection through a deviation from the average of a uniform image and defect detection through a steep gradient pixel for an acquisition assumed to be uniform can be combined; the combination of both criteria is done by multiplying both confidence maps, each one being performed according to a different criterion.

In this method, the justified hypothesis is put forward that the distribution of defective pixels is stable in time. Therefore, the defects will be visible on all the images acquired by the device. Indeed, defective pixel correction is specific to the detector and not to the image observed. It makes up for the missing information by using in the best possible way the information provided by the neighboring pixels and ensuring information continuity.

Images thus corrected are more easily processed visually by an operator for a given purpose, i.e. diagnosis.

Figure 1:
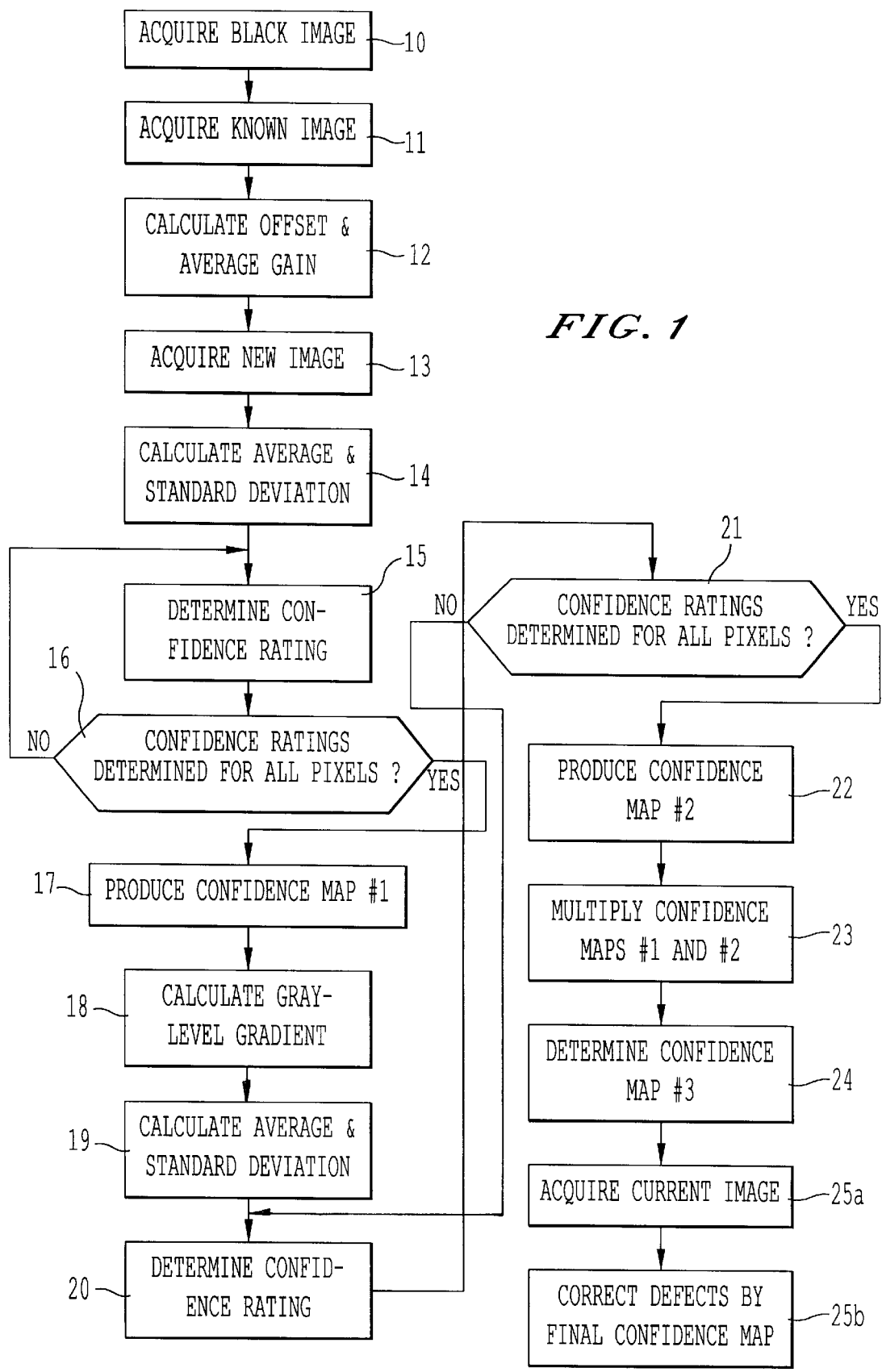
FIG. 1 shows the block diagram of the inventive method.

In FIG. 1, the block diagram of the main steps of the inventive method has been illustrated schematically. More precisely, the inventive method includes a step 10 for acquiring one or more black images, i.e. images taken in the dark, without emission of X or γ radiation. This black image acquisition allows to measure the noise of the electronics, of the reader asssociated to the detector.

The method then consists of a step 11 for acquiring one or more images of a known reference object. This reference image acquisition is done preferably with a uniform attenuation in case of an X-ray detector or a uniform emission in case of a γ-ray detector.

The next step of the inventive method, referenced as 12, consists in calculating offset and mean gain images Moy_N and Moy_G, with:

$$\text{average\_}N = 1/n \sum_{1}^{n} Nn$$

and $$\text{Moy\_}G = 1/n \sum_{1}^{n} (Gn - \text{Moy\_}N)$$

where Gn represents the images of the known reference object, Nn represents the black images, and where n is the number of images acquired both in step 10 and step 11.

The method proceeds with step 13 that consists in performing the acquisition of an image Im of the object to be measured, called "new image acquisition". This acquisition is done for a uniform attenuation, in case of an X-ray detector, or for a uniform emission, in case of a γ-ray detector. This image Im is then corrected as to offset and gain as follows:

$$\text{Im\_cor}(x, y) = K \cdot \left( \frac{\text{Im} - \text{Moy\_}N}{\text{Moy\_}G} \right)$$

where K is a user defined constant, and that is only meant to define the gray level dynamics for coding the pixel values of the corrected image.

However, the offset and gain correction can be done according to other methods than that described before and, e.g. by using a series of objects with different attenuations.

Step 14 then consists in determining the standard deviation (or variance) and the average in the corrected image Im_cor. This average and this variance are calculated for the offset corrected image. The average is determined by:

$$\text{average} = 1/_{nombre\_pixel} \Sigma_x \Sigma_y (\text{Im\_cor}(x, y)$$

and variance by $$\text{Var} = 1/_{nombre\_pixel} \Sigma_x \Sigma_y (\text{Im\_cor}(x, y) - \text{average})^2.$$

These average and variance values may be refined by removing the effect of absurd points. For this purpose, the image variance and average are recalculated only for pixels for which the difference between the value and the average is less than a percentage x % to the square root of the variance, with x being defined by the operator.

The inventive method proceeds with step 15 that consists in determining the confidence rating of each detector pixel. In other words, a confidence rating continuously included between 0 and 1 is calculated for each image pixel depending on the pixel's gray level value, the variance and average determined for the corrected image. More precisely, the confidence rating is determined by:

the pixel's gray level, determined according to the gray level standardization of all the pixels in view of obtaining a normal distribution:

$$\text{norm}(x, y) = \left| \frac{\text{Im\_cor} - (x, y) - \text{average}}{\text{Var}} \right|$$

transforming the value by the dispatching function F of normal distribution:

$$F(u) = \frac{1}{\sqrt{2\pi}} \int_{-\infty}^{u} e^{-y^2/2} dy$$

to obtain a so-called "normal" distance:

dist_norm(x, y)=F(norm(x, y))

calculating the pixel's confidence rating:

C1(x, y)=2(1−dist_norm(x, y)).

For a pixel with a starting gray level close to the average, the confidence rating is 1; the more the gray level value of the pixel moves away from the mean value, the more the confidence rating moves closer to 0.

The method proceeds with a test 16 that consists in checking whether all the confidence ratings of all the detector pixels have been determined. If not, the method continues determining confidence ratings, in step 15. If so, the method proceeds with step 17 that consists in creating a first confidence map C1. This confidence map groups all confidence ratings determined in step 15.

The method proceeds with step 18 that consists in determining, in the initial image Im, determined in step 13, the image's gray level gradient. More precisely, this step consists in:

calculating the gradient image grad_x(x, y) in the x direction of the image corrected in 13, e.g. by convoluting the image Im_cor by a $$\text{core} \begin{bmatrix} -1 & 0 & 1 \\ -2 & 0 & 2 \\ -1 & 0 & 1 \end{bmatrix};$$

calculating a gradient image grad_y(x, y) in the Y direction of the image Im_cor, e.g. by convoluting the image Im_cor by a $$\text{core} \begin{bmatrix} -1 & -2 & -1 \\ 0 & 0 & 0 \\ 1 & 2 & 1 \end{bmatrix}$$

calculating the gradient modulus from the expression:

Mod_grad(x, y)=√(grad_x, y)$^{2+{grad}}$_y(x, y)$^2$.

The method proceeds with step 19 calculating the variance and average of the gradient image obtained in step 18.

The variance and average of the gradient image are determined respectively by:

average_grad=1/$_{nombre-pixel}$Σ$_x$Σ$_y$Mod_grad(x, y)

Var_grad=1/$_{nombre-pixel}$Σ$_x$Σ$_y$(Mod_grad(x, y)−average_grad)$^2$.

These variance and average values may be refined by removing the effect of absurd points, as already explained for calculating the first variance and the first average in step 14.

The method of the invention proceeds with step 20 that consists in determining the confidence rating of each detector pixel, on the basis of its gray level and the average and variance determined for the gradient image. In other words, the confidence rating of each pixel is determined from:

the gray level standardization of all pixels, in order to obtain a normal distribution:

$$\text{norm\_grad}(x, y) = \left| \frac{\text{Mod\_grad}(x, y) - \text{average\_grad}}{\text{Var\_grad}} \right|$$

transforming the value by the dispatching function F of normal distribution $$F(u) = \frac{1}{\sqrt{2\pi}} \int_{-\infty}^{u} e^{-y^2/2} dy$$

to obtain a so-called "normal distance":

dist_norm_grad(x, y)=F(norm_grad(x, y))

calculating the pixel's confidence rating by:

C2(x, y)=2(1−dist_norm_grad(x, y)).

The method of the invention next includes a test 21 that consists in checking that the confidence rating of each detector pixel has actually been determined. As long as this is not true, step 20 is reset for each of the pixels. When it is true, the method proceeds with step 22 that consists in producing a second confidence map C2 composed of all the confidence ratings of all the detector pixels determined in step 20.

The method then proceeds with step 23 that consists in multiplying the first and second confidence maps, in order to obtain a third confidence map C3 (step 24). The confidence ratings of the third map are used for correcting the defective pixels of the image of the object to be measured (step 25); indeed, each defective pixel is replaced by its corresponding confidence rating in the confidence map C3. The determination of this third confidence map, called final confidence map, is determined from the equation:

C_final(x, y)=C1(x, y).C2(x, y).

The detector is calibrated only once. Then, the acquisition of several images can be performed on the detector and they can be corrected without the detector having to be recalibrated.

Correction step 25 first consists in performing the acquisition of an image of object (25a) called current image. Image correction step 25b can be carried out by means of filtering, such as the one proposed by KNUTSSON, using the final confidence map calculated in calibration step 24.

This filtering is described, in particular, in the document by H. KNUTSSON and C. WESTING, "Normalized and Differential Convolution, Method for Interpolation and Filtering of Incomplete and Uncertain Data", Proceedings CVPR 93, pp. 515–523, New York 1993.

In the simplest case (0 order), the method can be summed up as follows:

- an image I is considered, which is for instance the image acquired by the detector X;
- in addition, it is considered that a confidence image C is arranged over the image pixels;
- thus a new image filt_I can be constructed as follows:

$$\text{filt\_I} = (I.C)*a/C*a$$

where:
- "." and "/" are operators for multiplying and dividing the image pixel-wise;
- "*" is the convolution operator;
- a is the following convolution core $$a = \begin{cases} r^{-\alpha}\cos^{\beta}\left(\frac{\pi r}{2r_{max}}\right) & \text{for } r < r_{max} \\ 0 & \text{for } r > r_{max} \end{cases}$$

The image filt_I thus obtained is an image for which:
- in the areas having a uniform confidence rating, the processing effect is equivalent to filtering;
- for pixels with confidence lower than their neighbors', the processing effect is of the type called "soft interpolation" with a new value that will depend on the majority of strong confidence neighboring pixels.

The size and shape of the convolution core should be adapted to the size (minimum diameter) of the defects to be corrected.

Filtering according to the KNUTSSON method allows to correct image defects by using in the best possible way the information provided by the image's correct pixels. In addition, in the invention, in order to avoid introducing a filtering effect, even on correct areas where confidence in pixels is good, the inventive method proposes to combine the initial image and the corrected image in order to create a new corrected image weighted by the confidence ratings. This is expressed by the equation:

$$\text{Corr\_I} = \text{Im}.C\_\text{final} + (1-C\_\text{final}).\text{filt\_I},$$

where filt_I is the image filtered by the KNUTSSON method.

Correcting defective pixels on the basis of the third confidence map can be done through other filtering methods, like the partial derivative equation filtering method, described in the document by R. DE RICHES and O. FAUGERAS, titled "Les équations aux dérivés partielles en traitement des images et vision par ordinateur", published in the journal "Traitement du signal", vol. 13, no. 6, pp. 552–577, February 1996.

Figure 2:
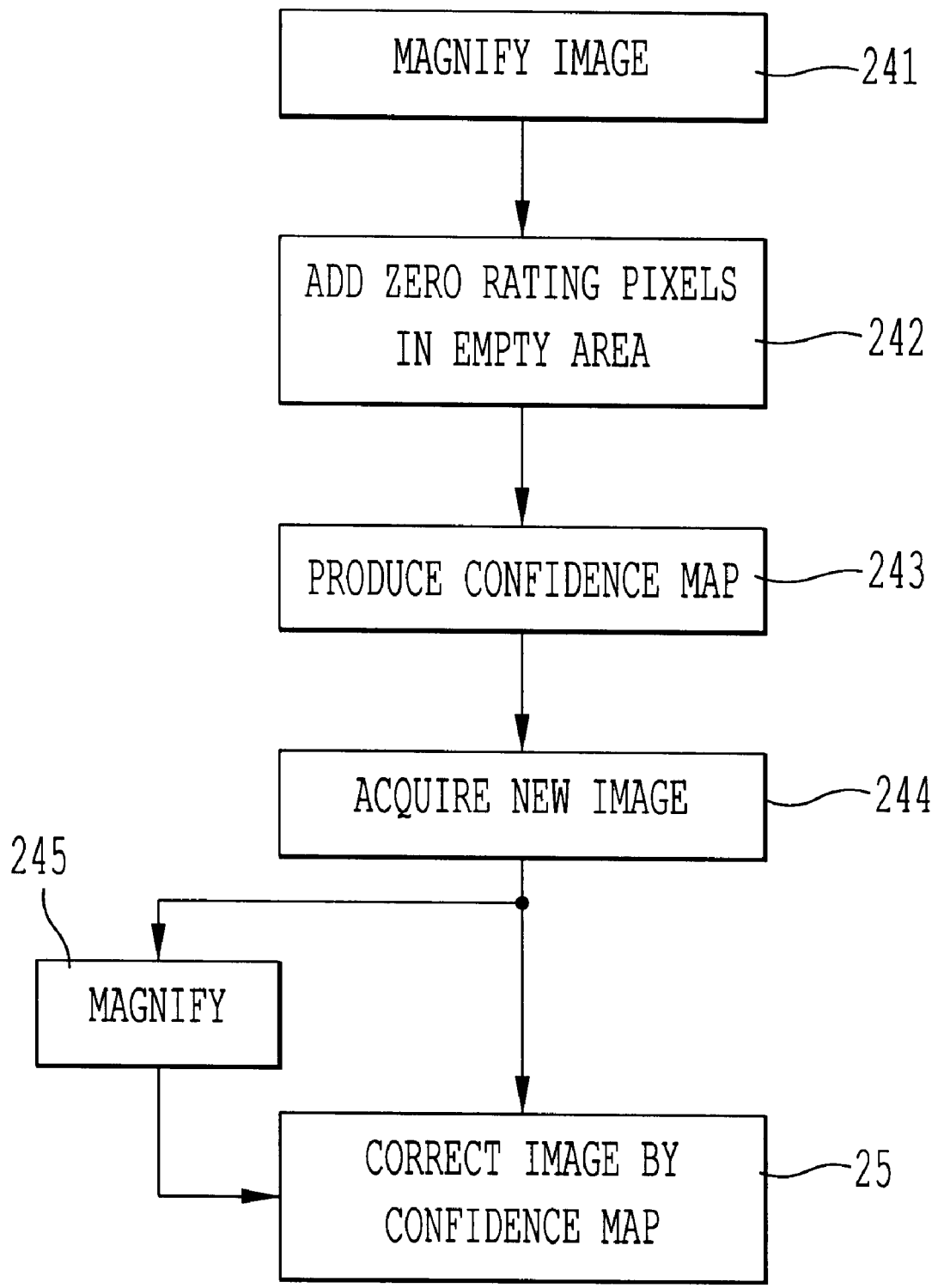
FIG. 2 shows the block diagram of an alternative embodiment of the invention.

An alternative embodiment of the inventive method relates to the case where the image defects are due to missing measurements in one or several detector areas. In this case, the inventive method consists in performing additional steps after step 24 of determining the third confidence map. These steps are illustrated in FIG. 2.

In this alternative embodiment, the inventive method includes a step 241 that consists in magnifying the object image in order to introduce areas of pixels not measured (or missing pixels) where the detector could not take measurements. Indeed, the image acquired is smaller than the image that would have been acquired with a detector capable of detecting the whole surface. Next, step 242 consists in adding, in these areas, pixels with zero confidence ratings. Then, step 243 consists in producing a fourth confidence map taking into account the zero confidence ratings of the pixels in the area not measured. This fourth confidence map is then considered as the final map.

The detector being calibrated, step 244 then consists in performing another image acquisition of the object to be measured, or current image. The latter is magnified (step 245), then corrected. It is based on this magnified current image and by applying the fourth confidence map that the image is corrected, in step 25 described before.

In other words, this alternative embodiment consists in introducing areas without information, i.e. pixels for which the detector could not take a measurement, into the final confidence image established in step 24; this is done by increasing the size of the confidence image. For this purpose, the image is split at the missing areas and pixels with zero confidence ratings are added to fill in the blanks of the image.

In FIGS. 3A, 3B, 3C and 3D, the different images are illustrated that were obtained during the inventive method, when the object to be examined is a tooth.

Figure 3A:
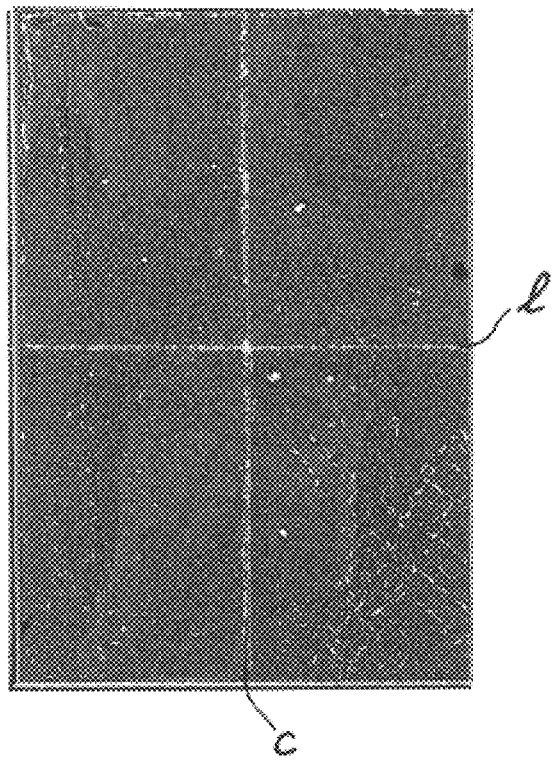
FIGS. 3A, 3B, 3C, 3D show examples of images obtained with or without the inventive method.

More precisely, FIG. 3A illustrates the image obtained when acquiring a known object with uniform attenuation. It appears in this figure that there is a line 1 and a column c with no information and moreover, that there are certain small potato-shaped areas left without information.

Figure 3B:
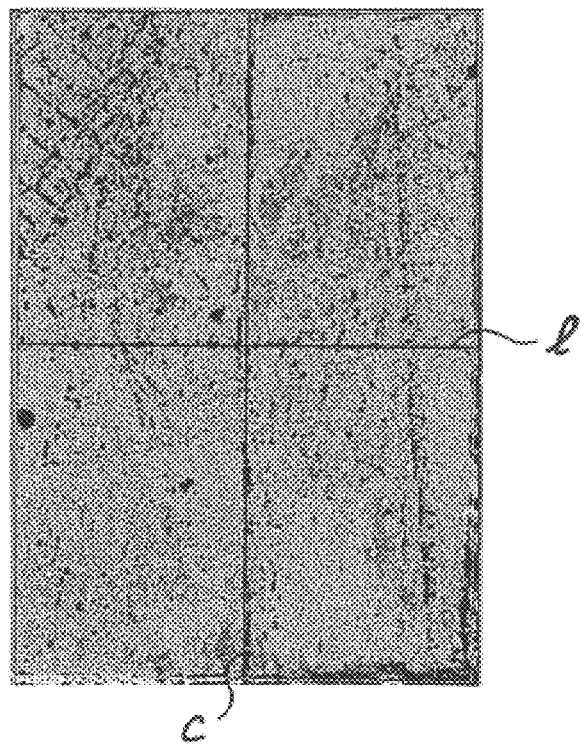

FIG. 3B illustrates the first confidence map C1 determined from the image of FIG. 3A and to which pixels with zero confidence ratings have been added instead of the missing areas, resulting in black areas.

Figure 3C:
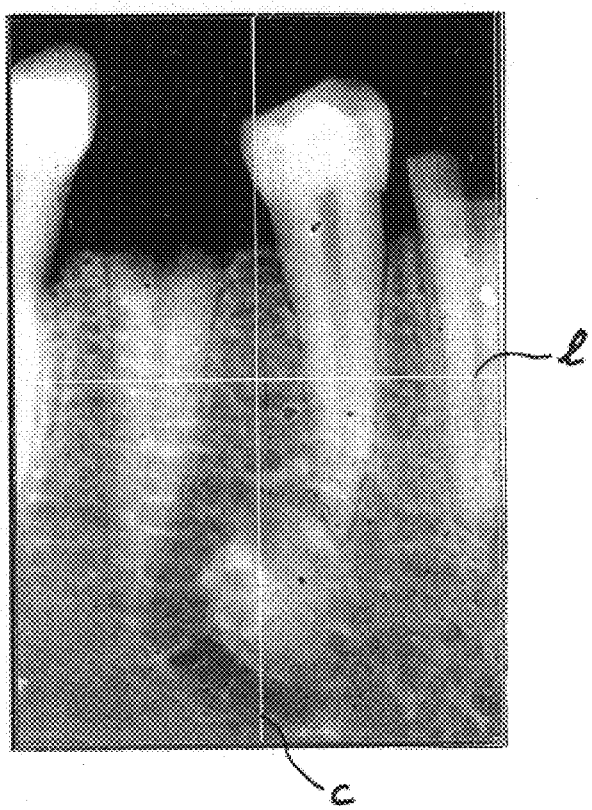
Figure 3D:

FIG. 3C illustrates the image of the teeth of a jaw, created without correcting the defects. FIG. 3D illustrates the same image, after defect correction by the invention method. When comparing these two figures, it can clearly be seen that the missing areas due to the detector's measuring defects, such as missing pixel line 1 and column c, have virtually, and even totally, disappeared in FIG. 3D, due to the defect correction method of the invention.

What is claimed is:

1. A method for correcting image defects from a matrix-type X or γ-ray detector, the image defects being related to defective image pixels or pixels not measured by the detector, comprising a detector calibration step, next a step for correcting defective pixels of the image to be corrected, characterized in that the calibration step comprises the following operations:

a) acquiring a black image (10);
   b) acquiring at least one image of a known object (11);
   c) determining at least one offset and mean gain image (12);
   d) acquiring at least one image of the object to be measured (13) with uniform attenuation when the detector is of the X-ray type and uniform emission when it is of the γ-ray type;
   e) determining (14) a first average and a first standard deviation for the whole image of the object to be measured;
   f) producing (17) a first confidence map (C1) depending on the gray level of the image pixels as well as the average and the standard deviation determined in step e);

and in that the correction step consists in acquiring an image of the object to be measured and correcting the image of the object on the basis of the confidence map and the last object image acquired.

2. The method according to claim 1, characterized in that the calibration step comprises, after the operation f) of producing a first confidence map, the following operations:

g) in the image of the known object, determining a gray level gradient (18);

h) determining (19–22) a second average and a second standard deviation, then a second confidence map (C2); and i) determining (24) a third confidence map (C3) by multiplying, pixel-wise, the first and second confidence maps.

3. The method according to claim 1, characterized in that the first and second confidence maps are composed of the set of confidence ratings assigned to each image pixel, the confidence rating of each pixel being determined depending on the gray level of said pixel, as well as the standard deviation and the average of the whole image of the object to be measured.

4. The method according to claim 1, characterized in that step b) of acquiring the image of a known object is carried out with a uniform attenuation.

5. The method according to claim 1, where the image defects are the result of the lack of measurement in at least one image area, characterized in that the calibration step, after operation f) or i) consists in:

magnifying (241) the image of the object to be measured;

adding (242), at the location of the image area not measured, pixels with zero confidence ratings; and determining (243) a fourth confidence map, on the basis of the first and third confidence maps, taking into account the zero confidence ratings;

and in that the correction step consists in performing another image acquisition of the object to be measured (244), applying the magnification to it and correcting the object image on the basis of the fourth confidence map and the last object image acquired.

* * * * *